United States Patent
Critchley et al.

(10) Patent No.: US 10,061,662 B2
(45) Date of Patent: Aug. 28, 2018

(54) ROUTING DATA STREAMS AROUND FAULTS IN STRANDS

(71) Applicant: International Business Machines Corporation, Armonk, NY (US)

(72) Inventors: Daniel S. Critchley, Winchester (GB); Gordon D. Hutchison, Eastleigh (GB); Gareth P. Jones, Chandlers Ford (GB); Jonathan W. L. Short, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 15/150,514

(22) Filed: May 10, 2016

(65) Prior Publication Data

US 2017/0329680 A1 Nov. 16, 2017

(51) Int. Cl.
| | | |
|---|---|---|
| *G06F 11/16* | (2006.01) | |
| *G06F 13/42* | (2006.01) | |
| *G06F 13/40* | (2006.01) | |
| *G06F 11/07* | (2006.01) | |

(52) U.S. Cl.
CPC ...... *G06F 11/1612* (2013.01); *G06F 11/0727* (2013.01); *G06F 13/4022* (2013.01); *G06F 13/4282* (2013.01)

(58) Field of Classification Search
USPC .......................................................... 714/42
See application file for complete search history.

(56) References Cited

U.S. PATENT DOCUMENTS

| 7,373,546 | B2 * | 5/2008 | Nguyen | G06F 11/2007 714/43 |
|---|---|---|---|---|
| 7,890,794 | B1 * | 2/2011 | Gasser | G06F 11/0727 711/159 |
| 8,074,105 | B2 * | 12/2011 | Kalwitz | G06F 11/2089 709/224 |
| 8,099,532 | B2 | 1/2012 | Cagno et al. | |
| 8,244,948 | B2 | 8/2012 | Johnson et al. | |
| 8,255,737 | B1 * | 8/2012 | Aster | G06F 11/201 710/2 |
| 8,694,708 | B2 * | 4/2014 | Jinno | G06F 3/0605 370/254 |

(Continued)

OTHER PUBLICATIONS

Gibbons, Terry, "Switched SAS", Sharable, Scalable SAS Infrastructure, Copyright © 2010 by LSI Corporation, Oct. 2010, 8 pages, <http://docplayer.net/2198924-Switched-sas-sharable-scalable-sas-infrastructure-terry-gibbons-director-software-planning-and-strategy-lsi-corporation.html>.

*Primary Examiner* — Kamini B Patel
(74) *Attorney, Agent, or Firm* — James H. Mayfield; William H. Hartwell (57) ABSTRACT

A fault-tolerant storage system includes a first strand comprising a first initiating device connected to a first expansion device of a first set of serially connected expansion devices, a second strand comprising a second initiating device connected to a first expansion device of a second set of serially connected expansion devices, and a plurality of zoning switches that each connect an expansion device in the first set of serially connected expansion devices to a corresponding expansion device in the second set of serially connected expansion devices. A computer program product and method executed by a computer corresponding to the above system are also disclosed herein.

20 Claims, 6 Drawing Sheets

(56) References Cited

U.S. PATENT DOCUMENTS

| | | | |
|---|---|---|---|
| 2008/0126849 A1* | 5/2008 | Kotzur | G06F 11/1092 714/6.32 |
| 2008/0244620 A1* | 10/2008 | Cagno | G06F 11/201 719/326 |
| 2008/0313658 A1* | 12/2008 | Cagno | G06F 13/4022 719/326 |
| 2009/0094664 A1* | 4/2009 | Butler | G06F 11/0727 726/1 |
| 2010/0241779 A1* | 9/2010 | Johnson | G06F 13/4022 710/300 |
| 2012/0137166 A1* | 5/2012 | Kurihara | G06F 11/2005 714/5.1 |
| 2012/0297052 A1* | 11/2012 | Qin | H04L 41/0677 709/224 |
| 2013/0031570 A1* | 1/2013 | Natrajan | G06F 3/0605 719/326 |
| 2013/0219393 A1* | 8/2013 | Myrah | G06F 9/45558 718/1 |
| 2014/0032960 A1* | 1/2014 | Konishi | G06F 11/1456 714/6.3 |
| 2014/0143453 A1* | 5/2014 | Myrah | G06F 3/00 710/19 |

* cited by examiner

ROUTING DATA STREAMS AROUND FAULTS IN STRANDS

BACKGROUND OF THE INVENTION

The present invention relates generally to storage systems, and more specifically, to storage systems that tolerate faults.

In the field of storage systems, a fault is an interruption of service or connectivity. When several disks are serially connected, a fault in one connection may interrupt the service of all disks downstream of the fault. One challenge for storage system design is to include a means of redundancy that increases the fault tolerance of the system without also greatly increasing the cost of the system.

SUMMARY

As disclosed herein, a fault-tolerant storage system includes a first strand comprising a first initiating device connected to a first expansion device of a first set of serially connected expansion devices, a second strand comprising a second initiating device connected to a first expansion device of a second set of serially connected expansion devices, and a plurality of zoning switches that each connect an expansion device in the first set of serially connected expansion devices to a corresponding expansion device in the second set of serially connected expansion devices. A computer program product and method executed by a computer corresponding to the above system are also disclosed herein.

DETAILED DESCRIPTION

Embodiments of the present invention relate generally to storage systems, and more specifically, to fault tolerance in storage systems. A storage system's fault tolerance refers to its ability to maintain access to disks despite one or more faults, or loss of connectivity in part of a strand. A strand may refer to a group of disks that are connected in series. Embodiments of the present invention route data streams around faults in a strand by creating a path through an adjacent strand, thus bypassing the fault.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter. The present invention will now be described in detail with reference to the figures.

Figure 1A:
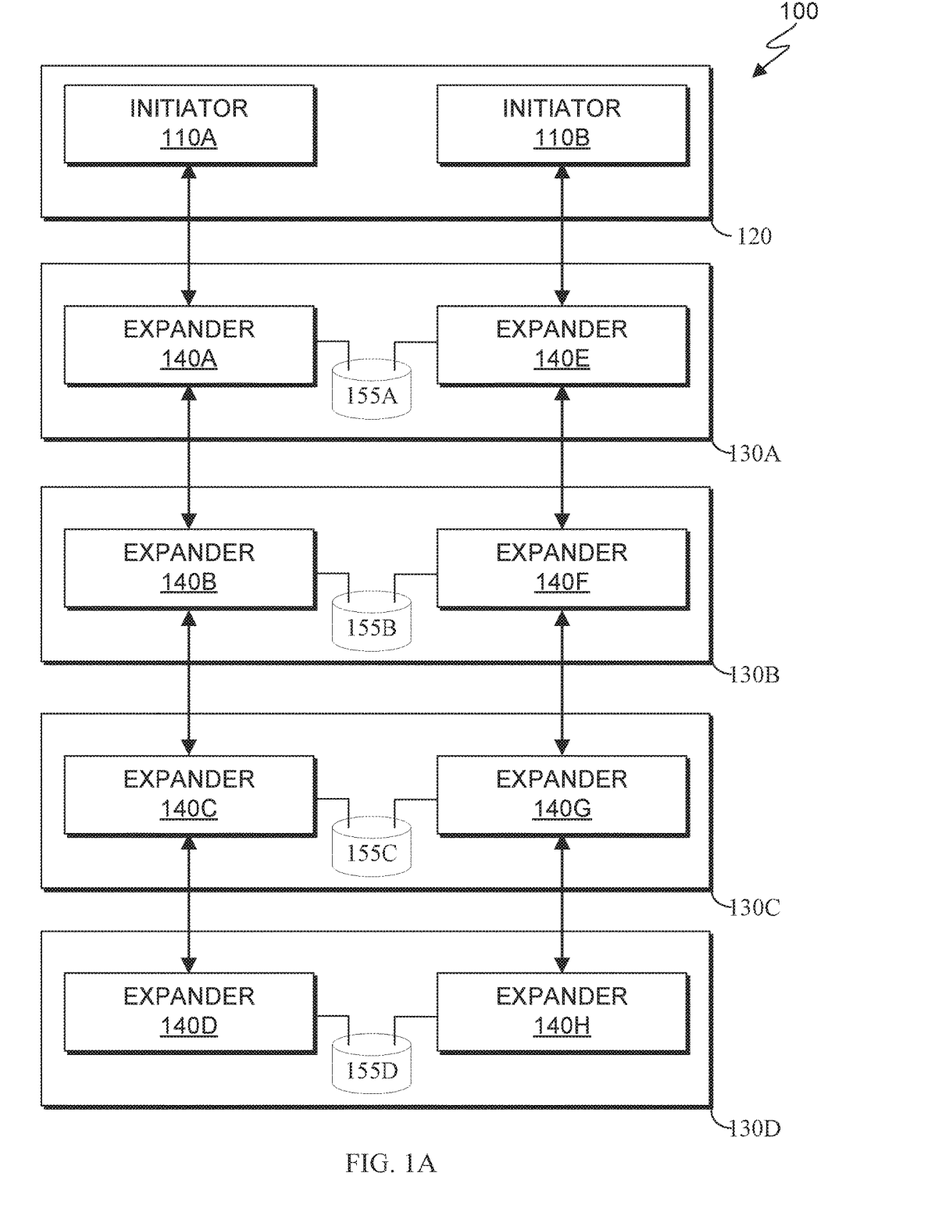
FIGS. 1A-1D are block diagrams depicting embodiments of a fault-tolerant storage system in accordance with the present invention.

FIG. 1A is a block diagram depicting an embodiment of a storage system 100 in accordance with the present invention. As depicted, storage system 100 includes initiators 110A and 110B, initiator enclosure 120, expander enclosures 130A-130D, expanders 140A-140H, and disks 155A-155D. In some embodiments, storage system 100 is a serial attached SCSI (SAS) storage system. Storage system 100 may have one or more initiators, such as initiator 110A and 110B. An initiator may be a device that originates device-service and task-management requests for processing by a target device and receives responses for the same requests from other target devices. Initiators may be provided as an on-board component on a motherboard or as an add-on host bus adapter. In some embodiments, initiators are housed in an initiator enclosure 120, a type of storage device enclosure.

Expanders 140A-140H may include devices that form part of a service delivery subsystem and facilitate communication between SAS devices. Expanders may facilitate the connection of multiple end storage devices to a single initiator. Multiple expanders may be stored in a single expander enclosure such as enclosures 130A-130D. In some embodiments, enclosures 130A-130D are the same type of enclosure, or substantially similar to, initiator enclosure 120. As depicted, storage system 100 has two strands: the first strand (shown on the left of FIGS. 1A-1D) that includes initiator 110A and expanders 140A-140D, and the second strand (shown on the right), which includes initiator 110B and expanders 140E-140H.

Disks 155A-155D may include any data storage device that may be communicate with expanders 140A-140H and initiators 110A and 110B. Disks 155A-155D may be associated with an enclosure as well as two expanders. For example, disk 155A is within enclosure 130A and is connected to expanders 140A and 140E. Thus, initiator 110A can access disk 155A from the left strand via expander 140A, and initiator 110B can access disk 155A from the right strand via expander 140E.

Figure 1B:
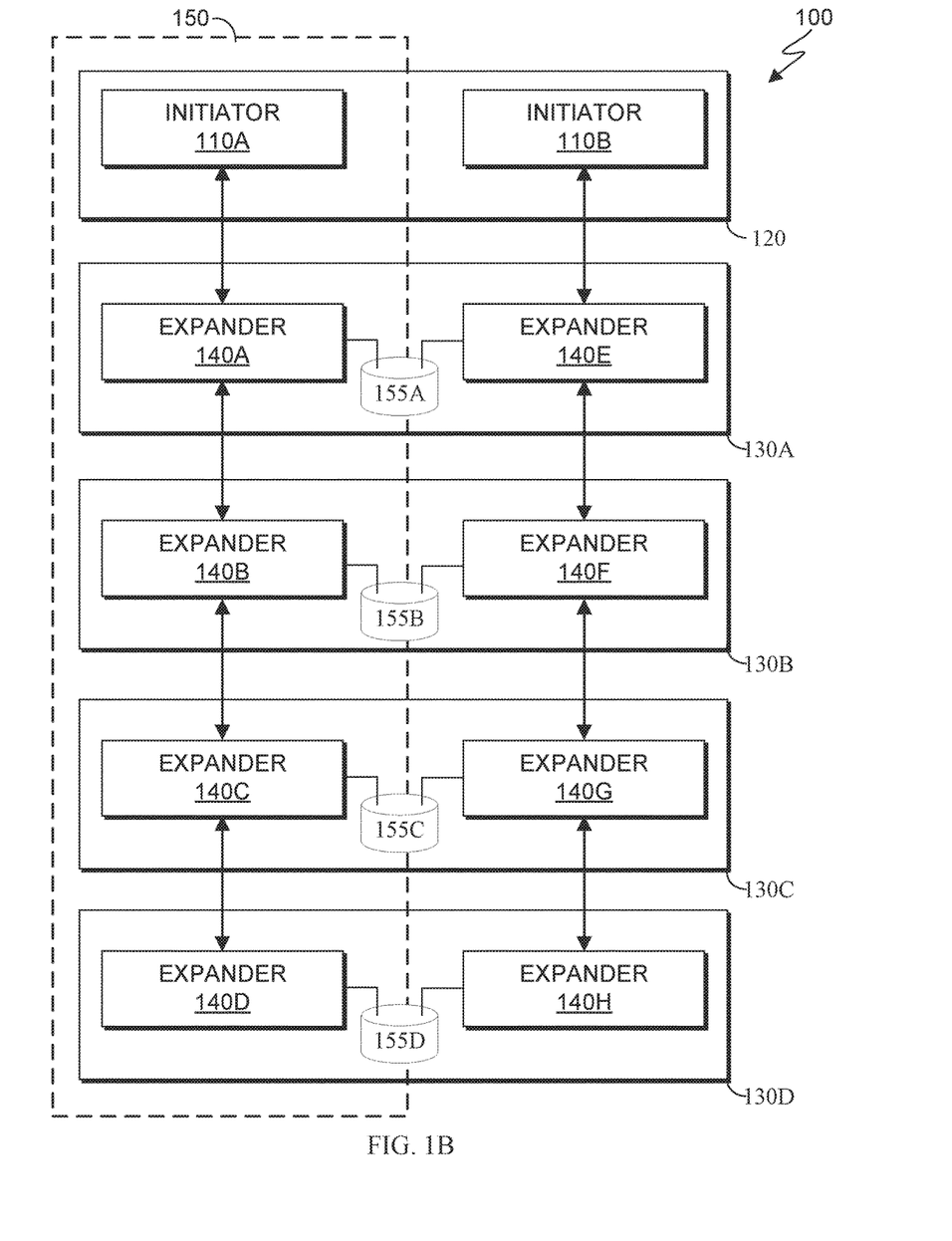
Figure 1C:
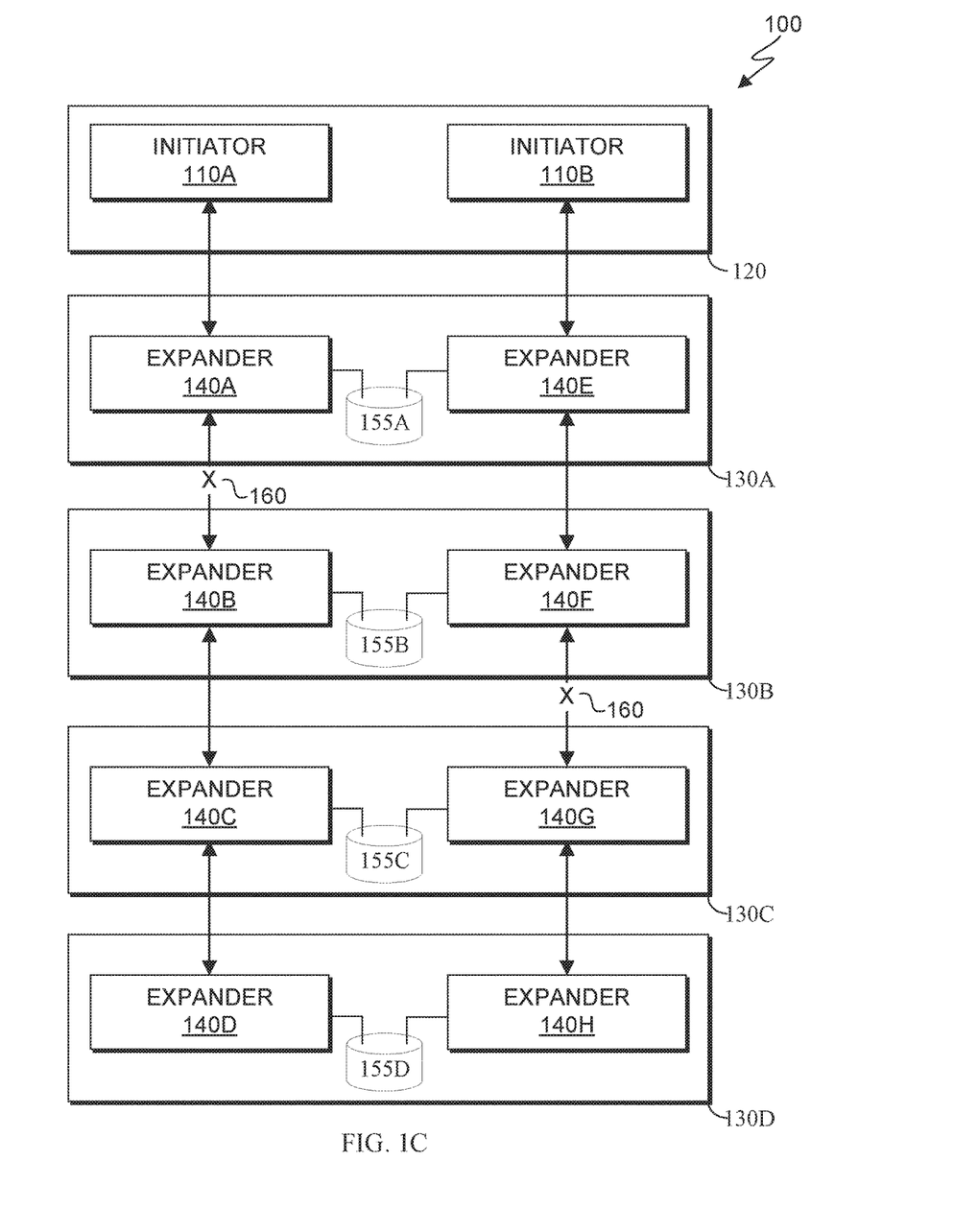

FIG. 1B is a block diagram depicting an embodiment of a storage system 100 in accordance with the present invention. As depicted, storage system 100 includes initiators 110A and 110B, initiator enclosure 120, expanders 140A-140H, expander enclosures 130A-130D, disks 155A-155D and zone group 150. Here, the left strand, which includes initiator 110A and expanders 140A-140D, form a zone group 150 Likewise, the right strand of initiator 110B and expanders 140E-140H form their own zone group. As depicted in FIG. 1C, if a fault 160 occurs, a zone group may lose connectivity downstream of the fault 160. For example, the fault 160 between expander 140A and expander 140B may cause loss of connectivity for expanders 140B-140D, and fault 160 between expander 140F and 140G may cause loss of connectivity for expanders 140G and 140H.

Figure 1D:
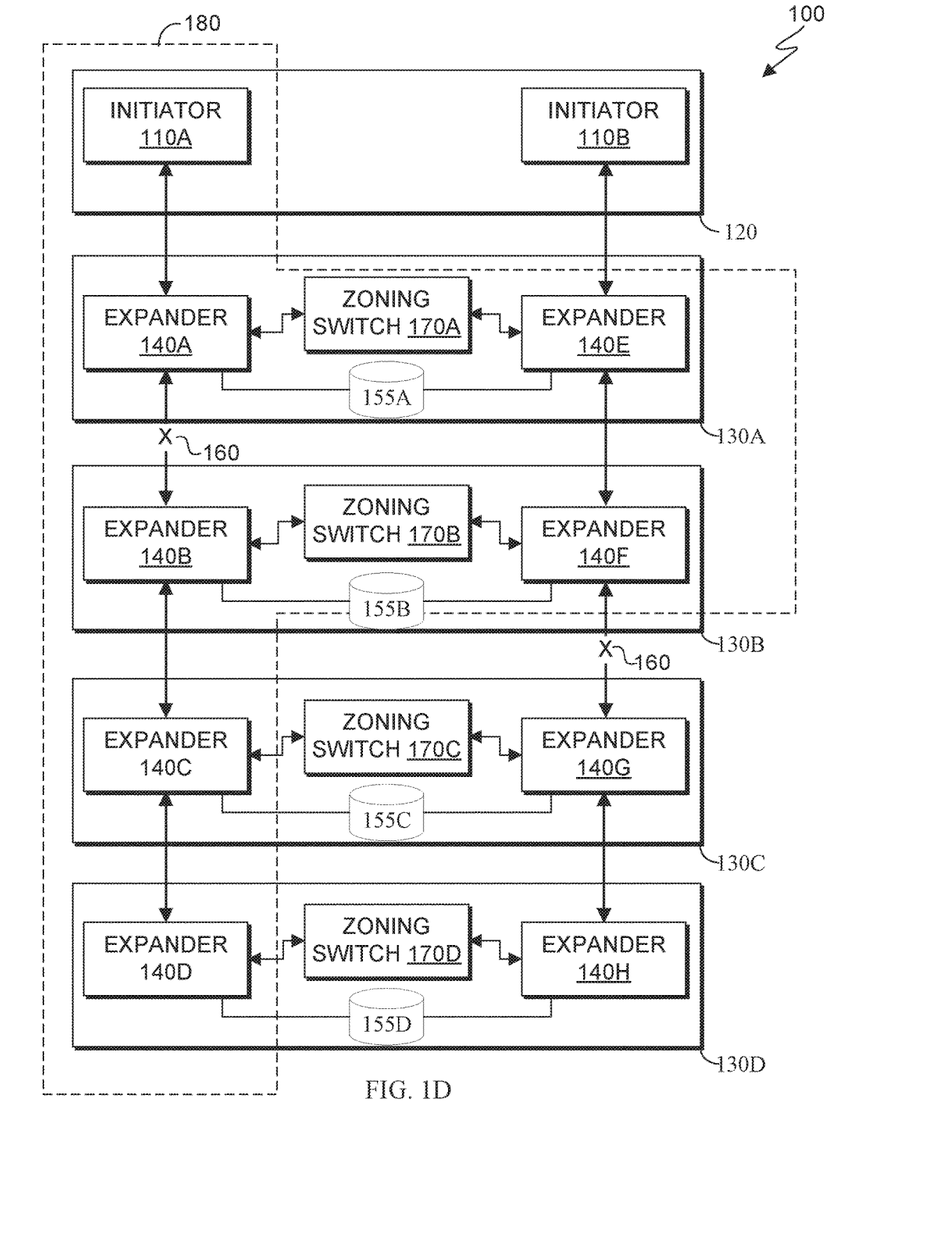

FIG. 1D is a block diagram depicting an embodiment of a storage system 100 in accordance with the present invention. As depicted, storage system 100 includes initiators 110A and 110B, initiator enclosure 120, expanders 140A-140H, expander enclosures 130A-130D, disks 155A-155D, zoning switches 170A-170D, and zone group 180. A zoning switch may provide connectivity between expanders on the same expander enclosure similarly to the connectivity that exists between expanders on the same strand. In some embodiments, zoning switches make use of preexisting hardware in the expander enclosure, such as physical connections, data buses, and the like.

When a fault 160 is detected, data from one strand may be routed through the zoning switch to another strand and back to the original strand downstream of the fault 160. For example, in response to the fault 160 between expander 140A and 140B, zone group 180 is formed. Zone group 180 routes data from initiator 110A to expander 140A, to expander 140E via zoning switch 170A, then to expander 140F to expander 140B via zoning switch 170B, and then to expanders 140B-140D. Similarly, the other strand may route around fault 160 between expander 140F and 140G by routing data from expander 140F to expander 140B via zoning switch 170B, then back to the strand by routing data from expander 140C to expander 140G via zoning switch 170C. The zone group 180 may be temporary and may revert back to a zone group such as zone group 150 in FIG. 1B once the fault 160 has been repaired.

Upon detection of a fault 160, disks 155A-155D may only be accessible by one side in order to prevent duplicate access. For example, initiator 110A may only have one path of accesses to drive 155A, which is via expander 140A. Initiator 110A may not access drive 155A through the path defined as: drive 155A to expander 150E to zoning switch 170A to expander 140A to initiator 110A, as that would provide initiator 110A with an unnecessary twofold access to drive 150A.

Figure 2:
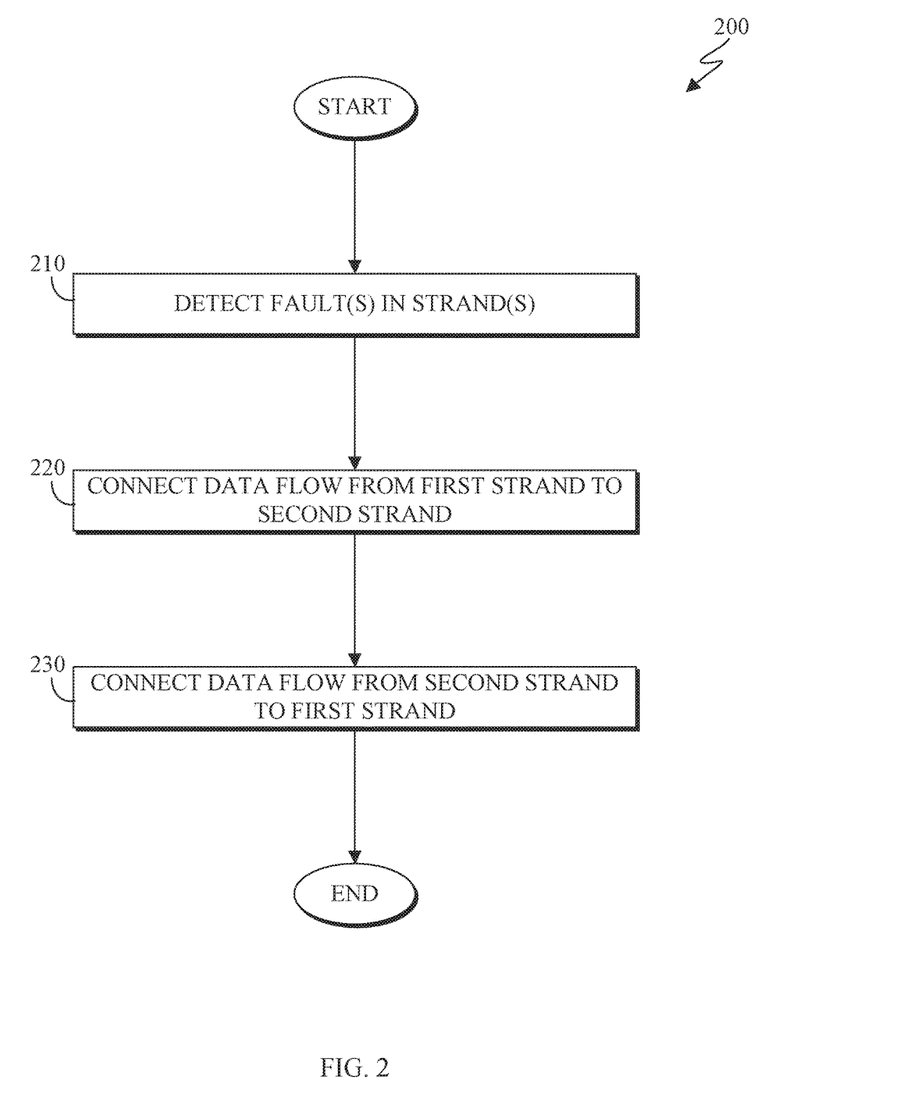
FIG. 2 is a flow chart depicting one embodiment of a rerouting method in accordance with the present invention.

FIG. 2 is a flow chart depicting one embodiment of a rerouting method 200 in accordance with the present invention. As depicted, the rerouting method 200 includes detecting (210) fault(s), connecting (220) data flow from a first strand to a second strand, and connecting (230) data flow from the second strand back to the first strand. The rerouting method 200 thus enables a system to tolerate faults.

Detecting fault(s) in a strand may include detecting a fault that is responsible for a downstream loss of connectivity. A loss of connectivity may be detected by pinging a devices starting from the terminal end of a strand, and if the device does not respond, working up toward the proximal end of the strand until a device responds to a ping. In some embodiments, one or multiple means of detecting a fault that are known in the art are employed.

Connecting (210) data flow from the first strand to the second strand may include rerouting data from a point upstream of the detected fault over to another strand. In some embodiments, the data flow is connected via a zoning switch, such as zoning switch 170 in FIG. 1D. The data flow may then proceed down the second strand to a point downstream of the fault, at which point data is connected (230) from the second strand back to the first strand. Thus, data may be routed around a fault in a strand by temporarily using an adjacent second strand. In some embodiments, three or more strands are used in the case of faults appearing in parallel locations of two or more strands.

Figure 3:
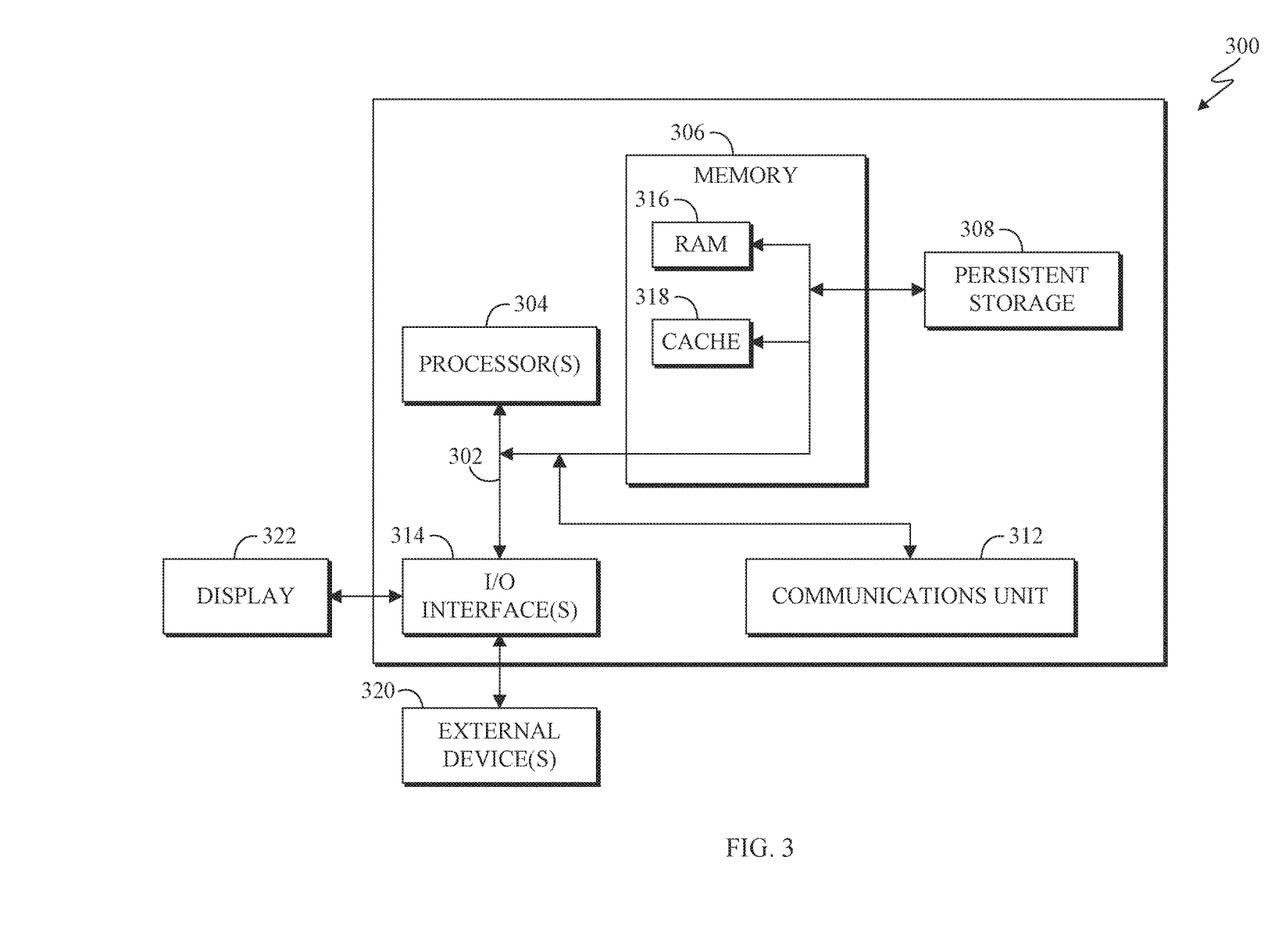
FIG. 3 is a block diagram depicting one example of a computing apparatus (i.e., computer) suitable for executing the methods disclosed herein.

FIG. 3 is a block diagram depicting components of a computer 300 suitable for executing the methods disclosed herein. It should be appreciated that FIG. 3 provides only an illustration of one embodiment and does not imply any limitations with regard to the environments in which different embodiments may be implemented. Many modifications to the depicted environment may be made.

As depicted, the computer 300 includes communications fabric 302, which provides communications between computer processor(s) 304, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In the depicted embodiment, memory 306 includes random access memory (RAM) 316 and cache memory 318. In general, memory 306 can include any suitable volatile or non-volatile computer readable storage media.

One or more programs may be stored in persistent storage 308 for execution by one or more of the respective computer processors 304 via one or more memories of memory 306. The persistent storage 308 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links.

I/O interface(s) 314 allows for input and output of data with other devices that may be connected to computer 300. For example, I/O interface 314 may provide a connection to external devices 320 such as a keyboard, keypad, a touch screen, and/or some other suitable input device. External devices 320 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 308 via I/O interface(s) 314. I/O interface(s) 314 may also connect to a display 322. Display 322 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A fault-tolerant storage system, the system comprising:
a plurality of hardware enclosures, including: (i) a first hardware enclosure including a first initiating device and a second initiating device, (ii) a second hardware enclosure including a first expansion device of a first set of serially connected expansion devices and a first expansion device of a second set of serially connected expansion devices, and (iii) a third hardware enclosure including a second expansion device of the first set of serially connected expansion devices and a second expansion device of the second set of serially connected expansion devices;
a first strand comprising the first initiating device connected to the first expansion device of the first set of serially connected expansion devices;
a second strand comprising the second initiating device connected to the first expansion device of the second set of serially connected expansion devices; and
a plurality of zoning switches that each connect an expansion device in the first set of serially connected expansion devices to a corresponding expansion device in the second set of serially connected expansion devices in the same enclosure, wherein, in response to detecting a fault in the first strand, an expansion device of the first set of serially connected expansion devices routes data that is destined for another expansion device in the first set of serially connected expansion devices through a zoning switch of the plurality of zoning switches, to an expansion device of the second set of serially connected expansion devices.

2. The system of claim 1, wherein the expansion device and the corresponding expansion device reside in a common hardware enclosure.

3. The system of claim 2, wherein a drive resides in the common hardware enclosure, and wherein the expansion device and the corresponding expansion device are both communicatively connected to the drive.

4. The system of claim 3, wherein in response to a fault immediately upstream of the common hardware enclosure, only one of the expansion device and the corresponding expansion device is communicatively connected to the drive.

5. The system of claim 2, wherein a zoning switch that connects the expansion device to the corresponding expansion device resides in the common hardware enclosure.

6. The system of claim 5, wherein each zoning switch uses existing circuitry inside of the common hardware enclosure to create a new path between the expansion device and the corresponding expansion device.

7. The system of claim 1, wherein the system is a dual path SAS disk enclosure network.

8. A method for providing redundancy to a storage system, the method comprising:
identifying a plurality of hardware enclosures, including: (i) a first hardware enclosure including a first initiating device and a second initiating device, (ii) a second hardware enclosure including a first expansion device of a first set of serially connected expansion devices and a first expansion device of a second set of serially connected expansion devices, and (iii) a third hardware enclosure including a second expansion device of the first set of serially connected expansion devices and a second expansion device of the second set of serially connected expansion devices;
detecting a first fault in a first strand, wherein the first strand comprises the first initiating device connected to the first expansion device of the first set of serially connected expansion devices;
connecting a data flow from the first strand to a second strand using a zoning switch in a first upstream hardware enclosure of the plurality of hardware enclosures, wherein the data flow is routed from the first strand to the second strand at a point upstream of the first fault, and wherein the second strand comprises the second initiating device connected to the first expansion device of the second set of serially connected expansion devices; and
connecting the data flow back from the second strand to the first strand using a zoning switch in a first downstream hardware enclosure of the plurality of hardware enclosures, wherein the data flow is routed from the second strand back to the first strand at a point downstream of the first fault.

9. The method of claim 8, further comprising:
detecting a second fault in the second strand, wherein the second fault is downstream of the first fault; and
wherein connecting the data flow back from the second strand to the first strand using the zoning switch in the first downstream hardware enclosure comprises connecting the data flow at a point that is downstream of the first fault and upstream of the second fault.

10. The method of claim 8, wherein the first fault occurs in a connection between two expansion devices of the first set of serially connected expansion devices.

11. The method of claim 9, wherein the second fault occurs in a connection between two expansion devices of the second set of serially connected expansion devices.

12. The method of claim 8, wherein a drive resides in the second hardware enclosure along with the first expansion device of the first strand and the first expansion device of the second strand, and wherein the first expansion device of the first strand and the first expansion device of the second strand are both communicatively connected to the drive.

13. The method of claim 12, wherein in response to a fault immediately upstream of the second hardware enclosure, only one of the first expansion device of the first strand and the first expansion device of the second strand is communicatively connected to the drive.

14. The method of claim 12, wherein each zoning switch uses existing circuitry inside of a common hardware enclosure to create a new path between an expansion device and a corresponding expansion device.

15. The method of claim 8, wherein the storage system is a dual path SAS disk enclosure network.

16. A computer program product for providing redundancy to a storage system, the computer program product comprising:
a computer readable storage medium and program instructions stored on the computer readable storage medium, the program instructions comprising instructions for:
identifying a plurality of hardware enclosures, including: (i) a first hardware enclosure including a first initiating device and a second initiating device, (ii) a second hardware enclosure including a first expansion device of a first set of serially connected expansion devices and a first expansion device of a second set of serially connected expansion devices, and (iii) a third hardware enclosure including a second expansion device of the first set of serially connected expansion devices and a second expansion device of the second set of serially connected expansion devices;
detecting a first fault in a first strand, wherein the first strand comprises the first initiating device connected to the first expansion device of the first set of serially connected expansion devices;
connecting a data flow from the first strand to a second strand using a zoning switch in a first upstream hardware enclosure of the plurality of hardware enclosures, wherein the data flow is routed from the first strand to the second strand at a point upstream of the first fault, andwherein the second strand comprises the second initiating device connected to the first expansion device of the second set of serially connected expansion devices; and connecting the data flow back from the second strand to the first strand using a zoning switch in a first downstream hardware enclosure of the plurality of hardware enclosures, wherein the data flow is routed from the second strand back to the first strand at a point downstream of the first fault.

17. The computer program product of claim 16, further comprising instructions for:

detecting a second fault in the second strand, wherein the second fault is downstream of the first fault; and wherein connecting the data flow back from the second strand to the first strand using the zoning switch in the first downstream hardware enclosure comprises connecting the data flow at a point that is downstream of the first fault and upstream of the second fault.

18. The computer program product of claim 16, wherein the first fault occurs in a connection between two expansion devices of the first set of serially connected expansion devices.

19. The computer program product of claim 17, wherein the second fault occurs in a connection between two expansion devices of the second set of serially connected expansion devices.

20. The computer program product of claim 16, wherein a drive resides in the second hardware enclosure along with the first expansion device of the first strand and the first expansion device of the second strand, and wherein the first expansion device of the first strand and the first expansion device of the second strand are both communicatively connected to the drive, and wherein in response to a fault immediately upstream of the second hardware enclosure, only one of the first expansion device of the first strand and the first expansion device of the second strand is communicatively connected to the drive.

* * * * *